(12) United States Patent
Vári et al.

(10) Patent No.: US 10,243,758 B2
(45) Date of Patent: Mar. 26, 2019

(54) APPARATUS AND METHOD FOR FILTERING TRANSACTIONS

(71) Applicant: ARM Limited, Cambridge (GB)

(72) Inventors: Péter Vári, Budapest (HU); Péter Czakó, Pilisvorosvar (HU)

(73) Assignee: ARM Limited, Cambridge (GB)

( * ) Notice: Subject to any disclaimer, the term of this patent is extended or adjusted under 35 U.S.C. 154(b) by 90 days.

(21) Appl. No.: 15/419,049

(22) Filed: Jan. 30, 2017

(65) Prior Publication Data

US 2017/0272271 A1   Sep. 21, 2017

(30) Foreign Application Priority Data

Mar. 17, 2016 (GB) .................................. 1604530.4

(51) Int. Cl.
*G06F 13/42* (2006.01)
*G06F 13/364* (2006.01)
*H04L 12/40* (2006.01)

(52) U.S. Cl.
CPC ...... *H04L 12/40019* (2013.01); *G06F 13/364* (2013.01); *G06F 13/4282* (2013.01); *H04L 12/40026* (2013.01)

(58) Field of Classification Search
CPC ......... H04L 12/40019; H04L 12/40026; G06F 13/364; G06F 13/4282
See application file for complete search history.

(56) References Cited

U.S. PATENT DOCUMENTS

2004/0225819 A1    11/2004  Ang
2007/0255873 A1*   11/2007  Chou .................... G06F 13/364
                                                        710/113

(Continued)

OTHER PUBLICATIONS

Combined Search and Examination Report for GB1604530.4 dated Aug. 15, 2016, 5 pages.

*Primary Examiner* — Mohamed A Kamara
*Assistant Examiner* — Ryan C Kavleski
(74) *Attorney, Agent, or Firm* — Nixon & Vanderhye P.C.

(57) ABSTRACT

An apparatus and method are provided for filtering transactions performed between a master device and a slave device, where each transaction comprises one or more transfers. The apparatus has a first interface for coupling to the master device and a second interface for coupling to the slave device. Routing circuitry is used to route, between the first interface and the second interface, signals representing each transfer. Filtering decision generation circuitry is arranged to perform a combinatorial operation to generate a filtering decision dependent on current values of one or more received input variables. The routing circuitry is then responsive to the filtering decision indicating a block condition for a current transfer, to block the current transfer by preventing one or more of the signals representing that current transfer from being passed between the first interface and the second interface in either direction. The filtering decision generation circuitry is responsive to assertion of the current transfer within the apparatus to generate the filtering decision, and thereafter to maintain that filtering decision for a duration of time that the current transfer is asserted, irrespective of a change in the values of the input variables. Such an approach provides a high performance solution while also enabling certain bus protocol violation scenarios to be avoided.

13 Claims, 11 Drawing Sheets

(56) References Cited

U.S. PATENT DOCUMENTS

| | | | |
|---|---|---|---|
| 2012/0096200 A1* | 4/2012 | Jeong | G06F 13/14 |
| | | | 710/110 |
| 2013/0067562 A1* | 3/2013 | Davis | G06Q 10/107 |
| | | | 726/14 |
| 2013/0121346 A1* | 5/2013 | Mitchell | H04L 69/163 |
| | | | 370/465 |
| 2016/0019180 A1* | 1/2016 | Liu | G06F 21/85 |
| | | | 710/110 |
| 2016/0055110 A1 | 2/2016 | Herbeck et al. | |

* cited by examiner

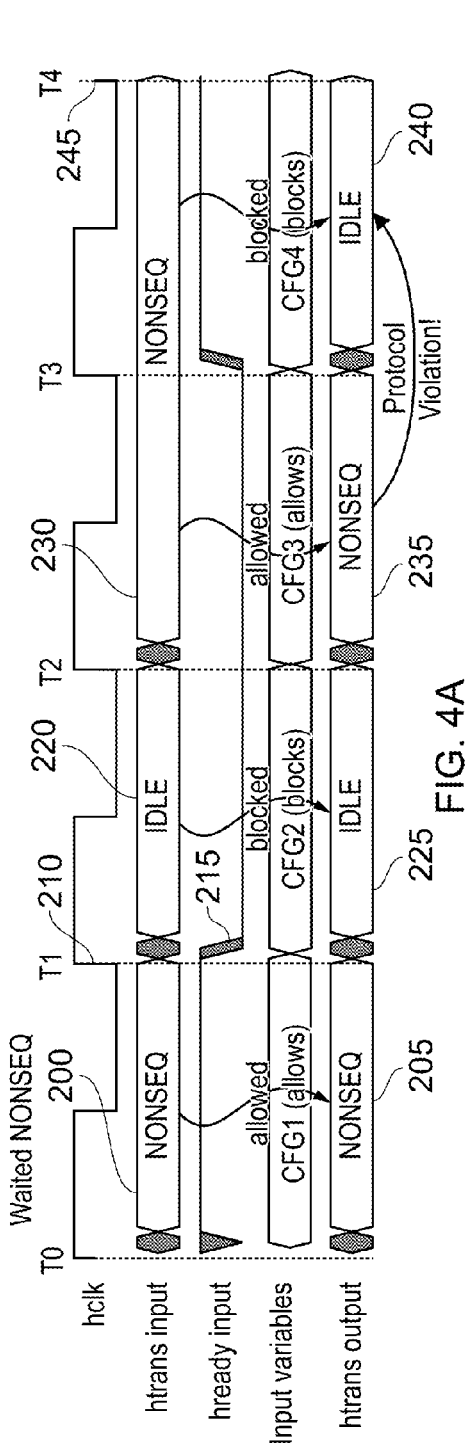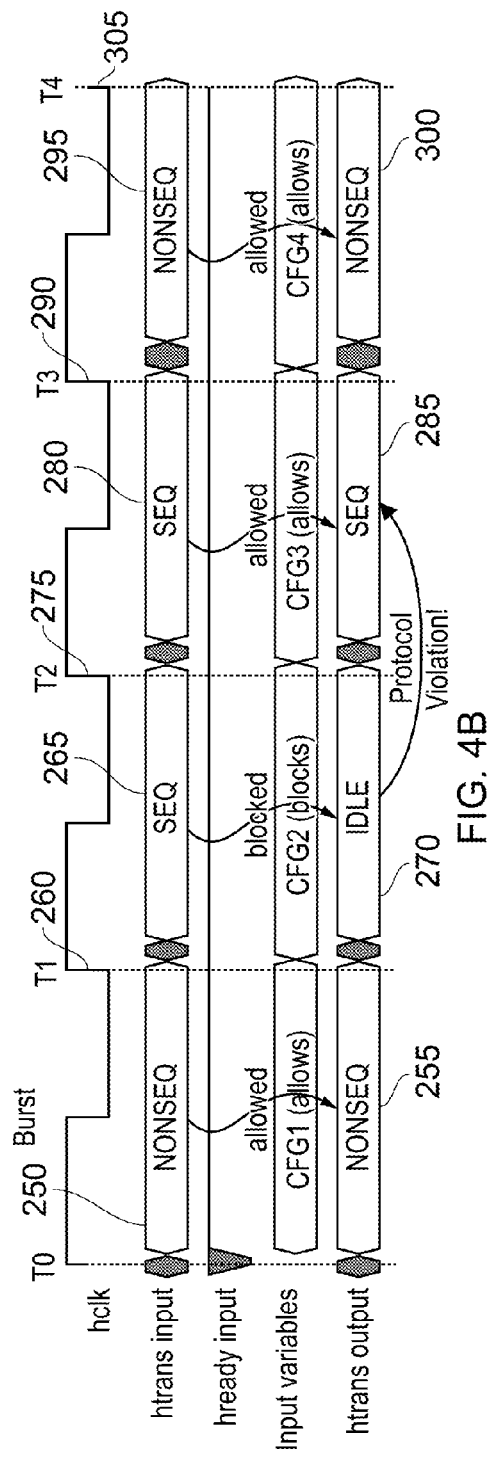

APPARATUS AND METHOD FOR FILTERING TRANSACTIONS

This application claims priority to GB Patent Application No. 1604530.4 filed Mar. 17, 2016, the entire content of which is hereby incorporated by reference.

BACKGROUND

The present technique relates to an apparatus and method for filtering transactions.

It is known to provide interconnect circuitry for interconnecting a number of master devices with a number of slave devices, to enable transactions to be performed between the master devices and the slave devices in order to transfer data between the master and slave devices. Each transaction between a master device and a slave device will comprise one or more transfers. Typically a predetermined bus protocol is used defining requirements for the various signals routed through the interconnect circuitry to represent the transfers, and allowed transitions in those signals.

At one or more locations in the connection paths provided by the interconnect circuitry between the master and slave devices, it may be desirable to perform a filtering operation to selectively block certain transfers. For instance, the filtering operation may determine that one or more transfers should not be allowed to proceed having regard to specified criteria. For example, considering a security-based filtering operation, it may be determined that a particular transfer would violate certain security requirements and accordingly should be blocked.

In order to ensure high performance, it is desirable that any such filtering operations do not introduce significant delay into the routing of the various signals of each transfer through the interconnect. However, it is also important to ensure that the filtering decisions made are managed carefully so as to ensure that they do not cause any violations to occur in respect of the bus protocol adopted within the interconnect circuitry.

SUMMARY

In one example configuration, there is provided an apparatus, comprising: a first interface to couple to a master device; a second interface to couple to a slave device, transactions being performed between the master device and the slave device, where each transaction comprises one or more transfers; routing circuitry to route between the first interface and the second interface signals representing the one or more transfers; and filtering decision generation circuitry to perform a combinatorial operation to generate a filtering decision dependent on current values of one or more received input variables; the routing circuitry being responsive to the filtering decision indicating a block condition for a current transfer, to block the current transfer by preventing one or more of the signals representing that current transfer from being passed between the first interface and the second interface; the filtering decision generation circuitry being responsive to assertion of the current transfer within the apparatus to generate the filtering decision and to maintain that filtering decision for a duration of time said current transfer is asserted, irrespective of a change in the values of said input variables.

In a second example configuration, there is provided a method of operating a filtering apparatus to filter transactions performed between a master device and a slave device, each transaction comprising one or more transfers, the filtering apparatus having a first interface for coupling to the master device, a second interface for coupling to the slave device, and routing circuitry to route between the first interface and the second interface signals representing the one or more transfers, the method comprising: performing a combinatorial operation to generate a filtering decision dependent on current values of one or more received input variables; responsive to the filtering decision indicating a block condition for a current transfer, causing the routing circuitry to block the current transfer by preventing one or more of the signals representing that current transfer from being passed between the first interface and the second interface; and responsive to assertion of the current transfer within the filtering apparatus, generating the filtering decision and maintaining that filtering decision for a duration of time said current transfer is asserted, irrespective of a change in the values of said input variables.

In a yet further example configuration, there is provided an apparatus, comprising: first interface means for coupling to a master device; second interface means for coupling to a slave device, transactions being performed between the master device and the slave device, where each transaction comprises one or more transfers; routing means for routing between the first interface means and the second interface means signals representing the one or more transfers; and filtering decision generation means for performing a combinatorial operation to generate a filtering decision dependent on current values of one or more received input variables; the routing means for blocking a current transfer, responsive to the filtering decision indicating a block condition for the current transfer, by preventing one or more of the signals representing that current transfer from being passed between the first interface means and the second interface means; the filtering decision generation means for generating, responsive to assertion of the current transfer within the apparatus, the filtering decision and for maintaining that filtering decision for a duration of time said current transfer is asserted, irrespective of a change in the values of said input variables.

BRIEF DESCRIPTION OF THE DRAWINGS

The present technique will be described further, by way of example only, with reference to embodiments thereof as illustrated in the accompanying drawings, in which:

FIGS. 4A and 4B are timing diagrams illustrating two potential bus protocol violations that can arise when not adopting the filtering techniques of the described embodiments;

DESCRIPTION OF EMBODIMENTS

Figure 1:
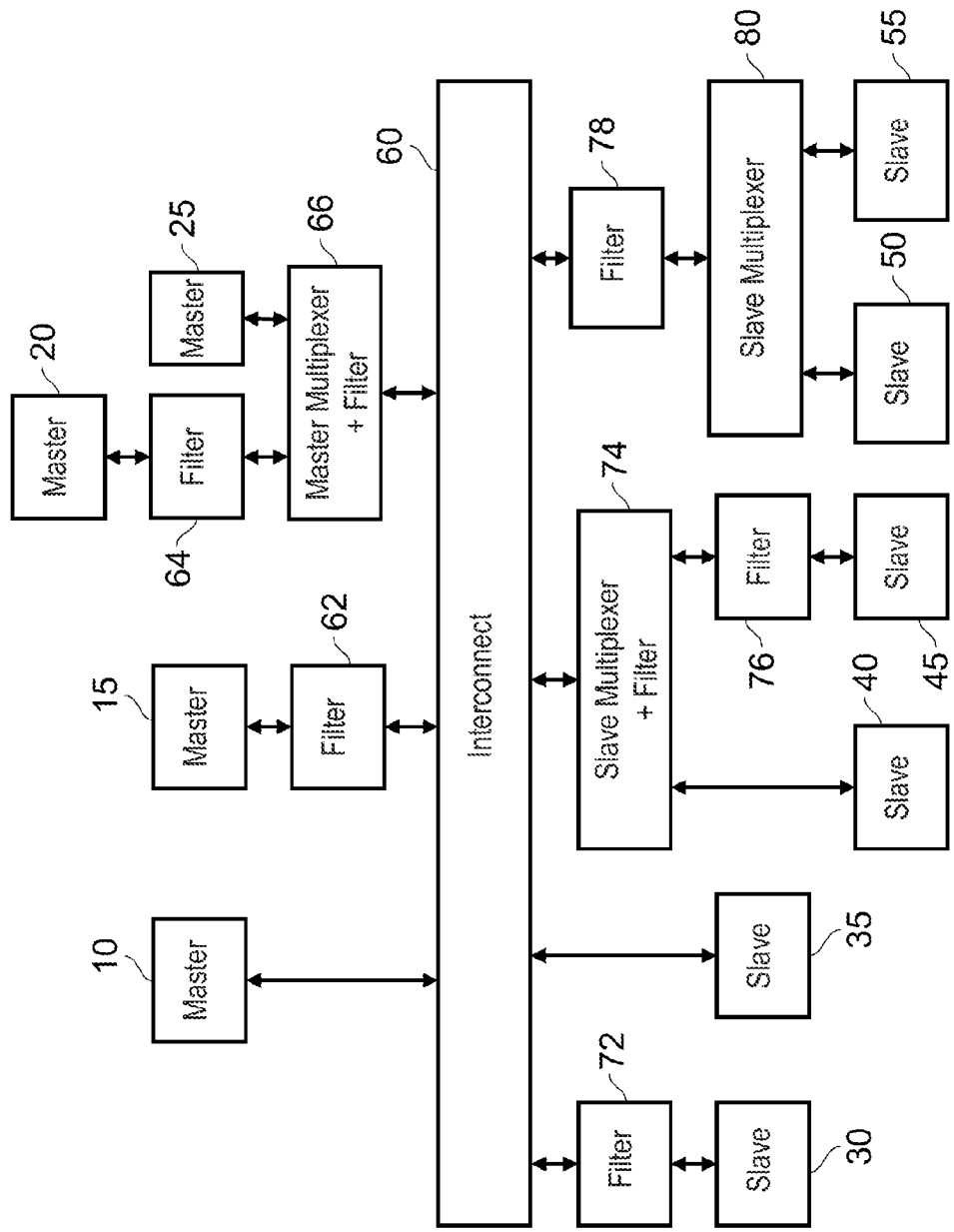
FIG. 1 is a block diagram of a system including a number of instances of filtering circuitry in accordance with one embodiment.

Before discussing the embodiments with reference to the accompanying figures, the following description of embodiments is provided.

In one embodiment, an apparatus is provided that has a first interface coupled to a master device and a second interface coupled to a slave device. Transactions are performed between the master device and the slave device, where each transaction comprises one or more transfers.

The apparatus further has routing circuitry to route, between the first interface and the second interface, signals representing each transfer. Filter decision generation circuitry is then used to perform a combinatorial operation to generate a filtering decision dependent on current values of one or more received input variables. If the filtering decision indicates a block condition for a current transfer, the routing circuitry is arranged to block the current transfer by preventing one or more of the signals representing that current transfer from being passed between the first interface and the second interface. These signals can pass in either direction between the first interface and the second interface, and in a typical transfer there will indeed be some signals passing from the first interface to the second interface and some signals passing from the second interface to the first interface. In some embodiments all such signals may be blocked for a blocked transfer, whilst in other embodiments one or more signals may still be propagated, e.g. for bus protocol reasons. For example, in one embodiment a signal providing an address may still be propagated, even though one or more signals identifying presence of the actual transfer request are not and hence the transfer is effectively blocked.

In accordance with the described embodiment, the filtering decision generation circuitry generates the filtering decision responsive to assertion of each transfer within the apparatus, and thereafter maintains that filtering decision for a duration of time that each current transfer is asserted, irrespective of the change in the values of the input variables.

The inventors realised that to reduce any performance impact that the filtering decision generation process could have on the propagation of transfers through the apparatus, it would be useful to arrange the filtering decision generation circuitry so that it performed a combinatorial operation, thereby allowing its output to change without delay in response to a change in the value of one or more of the received input variables. However, the value of one or more of the input variables may change at an arbitrary time relative to the processing steps performed within the apparatus, and the inventors realised that this could potentially cause transitions in certain of the signals routed through the apparatus that would violate the bus protocol requirements.

To alleviate this problem, the filtering decision generation circuitry is arranged such that, whilst the filtering decision is generated using a combinatorial operation, the filtering decision generation circuitry generates that filtering decision in response to assertion of a current transfer, and then maintains that filtering decision whilst the current transfer remains asserted within the apparatus. This enables the performance benefits of employing a combinatorial operation to be realised, whilst ensuring that the filtering decision that is utilised by the routing circuitry is not changed during the period of time that each transfer is asserted. It has been found that such an approach enables certain bus protocol violating scenarios to be avoided.

In one embodiment, the filtering decision generation circuitry comprises a filtering decision storage element to store the filtering decision generated in response to assertion of the current transfer, the stored filtering decision then being used for the remaining duration of time that the current transfer is asserted. This provides an effective mechanism for ensuring that the filtering decision is maintained for the duration of time the current transfer is asserted.

The transactions performed between the master device and the slave device can take a variety of forms. In one embodiment, at least one transaction is a burst transaction comprising multiple transfers. When handling such a burst transaction, the filtering decision generation circuitry may be arranged to be responsive to assertion within the apparatus of a first transfer of the burst transaction to determine, from at least one of the input variables, a configuration value for use when performing the combinatorial operation to generate the filtering decision. A configuration storage element may be provided in which to store that configuration value, and the stored configuration value is then used by the filtering decision generation circuitry when generating filtering decisions for each remaining transfer of the burst transaction. This ensures that, for each of the individual transfers of a burst transactions, the configuration value is unchanged. Hence, whilst a filtering decision is still made for each transfer of the burst transaction, and the filtering decision may indeed be different for different transfers within the burst transaction, any such changes are not due to changes in the one or more input variables that are used to determine the configuration value, and hence any changes in those input variables during performance of the burst transaction will not affect the filtering decision made for each transfer of the burst transaction. It has been found that such an approach alleviates the likelihood of a further potential bus protocol violation scenario arising.

As mentioned earlier, when handling burst transactions, the filtering decision generation circuitry may generate different filtering decisions for different transfers of the burst transaction. However, in one embodiment, the filtering decision generation circuitry is arranged, when the filtering decision indicates a block condition for one transfer of the burst transaction, to maintain the filtering decision to indicate the block condition for any remaining transfers of the burst transaction. Hence, in such an embodiment, once the current transfer has been blocked, then the filtering decision is not re-evaluated for any remaining transfers of the burst transaction, and instead that current blocking filtering decision is reused for all of the remaining transfers of the burst transaction. Such an approach can lower the area and complexity of the circuitry required within the apparatus to handle subsequent transfers of a burst transaction that follow a transfer that has been blocked.

However, if desired, in accordance with an alternative embodiment the apparatus can be arranged so that filtering decisions continue to be made for any such remaining transfers of the burst transaction, and if one or more of those filtering decisions allow the associated transfer to be propagated (i.e. not blocked), then any such additional transfers are allowed to be propagated through the apparatus. However, in one embodiment, additional steps are taken to ensure appropriate handling of any such transfers having regard to the bus protocol requirements. In particular, the filtering decision generation circuitry may be arranged, when the filtering decision indicates a block condition for one or more transfers of the burst transaction, to cause the routing circuitry to output one or more control signals in association with a first subsequent transfer that is not blocked, to identify that first subsequent transfer as being a first transfer of a new burst transaction. Hence, once one of the transfers of a burst transaction has been blocked, then if a subsequent transfer is to be allowed, a new burst transaction is effectively created, with that subsequent transfer forming the first transfer of that newly created burst transaction. It will be appreciated that, dependent on the bus protocol used, a number of different control signals may need to be changed to cause the new transaction to be created, and to specify the appropriate burst length of that newly created burst transaction.

The transfers of each transaction can take a variety of forms, but in one embodiment each transfer comprises an address phase and a data phase, and the filtering decision generation circuitry is arranged to generate the filtering decision on assertion of the address phase. In one particular embodiment, the address and data phases can be pipelined, so that at any particular point in time the address phase of a current transfer may be being processed by the apparatus whilst the data phase of a preceding transfer is also being processed. The filtering decision applied to the signals of the address phase and the data phase is the filtering decision determined for the relevant transfer, and accordingly in the above example the apparatus may be applying one filtering decision to the address phase it is currently processing, and a different filtering decision to the data phase that it is also processing at the same time.

In one embodiment, under a predetermined condition, the address phase remains asserted for multiple clock cycles, and the filtering decision generation circuitry is arranged to generate the filtering decision in a first clock cycle that the address phase is asserted and to maintain the filtering decision for at least the multiple clock cycles that the address phase remains asserted. By ensuring that the same filtering decision is used for the duration of the multiple clock cycles representing the extended address phase, this avoids a potential bus protocol violation that could otherwise arise in some situations.

The predetermined condition that causes the address phase to be extended can take a variety of forms, but in one embodiment is a wait condition indicating that handling of a data phase of a preceding transfer is still in progress. In one particular embodiment, the slave device can issue a ready signal indicating whether it is ready to receive the address phase of a next transfer, and may clear that ready signal whilst it is still in the process of handling a data phase of a preceding transfer, to thereby cause occurrence of the above-mentioned wait condition.

In one embodiment, when the filtering decision indicates the block condition, then the address phase signals (or at least the one or more signals that define that there is an actual transfer request—as mentioned earlier in one embodiment the address signal may still be propagated) will not be propagated to the slave device via the second interface. Accordingly, no data phase response signals will be generated by that slave device for routing back through the apparatus for onward propagation to the master device via the first interface. However, in one embodiment, when the filtering decision indicates the block condition, the routing circuitry is arranged to internally generate one or more signals to be issued from the first interface for the data phase. The form that those signals take can vary dependent on embodiment. For example, if it is desired to identify to the master device that the transfer has not been processed, those signals can take the form of an error response identifying to the master device that the transfer has not been processed. However, in some instances, for example in certain security filtering applications, it may be considered not to be desirable to flag to the master device that the transfer has not occurred, and instead dummy data phase response signals can be generated for returning to the master device to effectively provide a fake data response.

Whilst in one embodiment the first interface of the apparatus may be connected directly to the master device, in alternative embodiments the first interface may be coupled to the master device via one or more intervening components. Similarly, whilst the second interface may be connected directly to the slave device, in an alternative embodiment the second interface may be coupled to the slave device via one or more intervening components.

In one example embodiment, there is provided interconnect circuitry comprising a network of connection paths for interconnecting a plurality of master devices and a plurality of slave devices to enable transactions to be performed between the master devices and the slave devices. One or more filtering circuits are then located in selected connection paths of the network, each filtering circuit comprising a filtering apparatus as described above.

Particular embodiments will now be described with reference to the Figures.

FIG. 1 is a block diagram of a system including a number of instances of filtering circuitry in accordance with one embodiment. More particularly, FIG. 1 schematically shows interconnect circuitry used to interconnect a plurality of master devices 10, 15, 20, 25 with a plurality of slave devices 30, 35, 40, 45, 50, 55. The master devices can take a variety of forms, for example one or more of the master devices may be central processing units (CPUs), whilst other master devices may be graphics processing units (GPUs), Direct Memory Access (DMA) units, etc.

Similarly, the slave devices can take a variety forms, for example memory devices such as SRAM or FLASH, general purpose I/O devices (GPIOs), display buffers, etc. In one embodiment, the system shown in FIG. 1 forms a System-on-Chip (SoC) where the various master devices, slave devices, and the interconnect circuitry are integrated into a single chip. In such an arrangement, one or more of the slave devices may in fact form interface circuitry to an off-chip component.

All of the components in FIG. 1, except for the master devices 10, 15, 20, 25 and the slave devices 30, 35, 40, 45, 50, 55 can be considered as forming the interconnect circuitry interconnecting the master and slave devices. For simplicity, only the separate filter circuits, and any associated multiplexers, are shown separately, and all of the other components of the interconnect circuitry are shown schematically by the interconnect block 60 in FIG. 1.

As shown in FIG. 1, filter circuits can be provided in a variety of locations within the interconnect circuitry. For example, some filter circuits may be provided in association with a specific master device, such as the filter circuit 62 associated with the master device 15 and the filter circuit 64 associated with the master device 20. Similarly, certain filter circuits may be associated with particular slave devices, such as the filter circuit 72 associated with the slave device 30 and the filter circuit 76 associated with the slave device 45. As shown in FIG. 1, it is also possible to have one filter circuit associated with multiple slave devices, such as the filter circuit 78 associated with the slave devices, 50, 55, with an intervening slave multiplexer 80 being used to route signals between the filter circuit 78 and the appropriate slave device 50, 55.

As also shown in FIG. 1, it is possible to integrate the filter circuitry within a multiplexer, either on the master side as shown by the master multiplexer and filter circuitry 66, or on the slave side as shown by the slave multiplexer and filter circuitry 74. Considering for example the slave multiplexer and filter circuitry 74, a filter circuit can be provided at the input from the interconnect 60. As will be discussed in more detail later with reference to the remaining figures, the filter circuitry can selectively block certain transfers, as a result of which one or more of the signals forming part of that transfer that are destined to be passed from the master device to the slave device will be blocked from onward propagation to the slave device. In addition, the filter circuitry will then internally generate some form of response signal(s) to return back to the master device, in place of the response signals that would have been generated by the slave device had the transfer not been blocked. Within the slave multiplexer and filter circuitry 74, an additional internal target for the multiplexer circuitry can be provided, in addition to the real slave targets 40 and 45, and in the event that the filter circuitry decides to block a transfer, the internal target will be selected by the slave multiplexer. That internal slave target will then be responsible for generating the suitable response signals to return to the master device for the blocked transfer.

Considering the master multiplexer and filter circuitry 66, in one embodiment that unit will contain separate filter circuits associated with each of the masters, such that only transfers that are not blocked will be subjected to the multiplexing operation. Such an approach can avoid the possibility that a blocked transfer could potentially delay onward propagation of a non-blocked transfer from a different master device.

Whilst FIG. 1 shows a variety of different filter circuits provided within the interconnect circuitry, it will be appreciated that in any actual implementation the exact number of filter circuits provided, and their particular placements within the interconnect circuitry, can be varied as desired. Further, whilst FIG. 1 shows a variety of different possible locations for the filter circuits, it is not intended to show every possible variant of filter circuitry location. Purely by way of illustration, it would for example be possible to provide a filter circuit on one or more of the outputs from the slave multiplexer 80.

Figure 2:
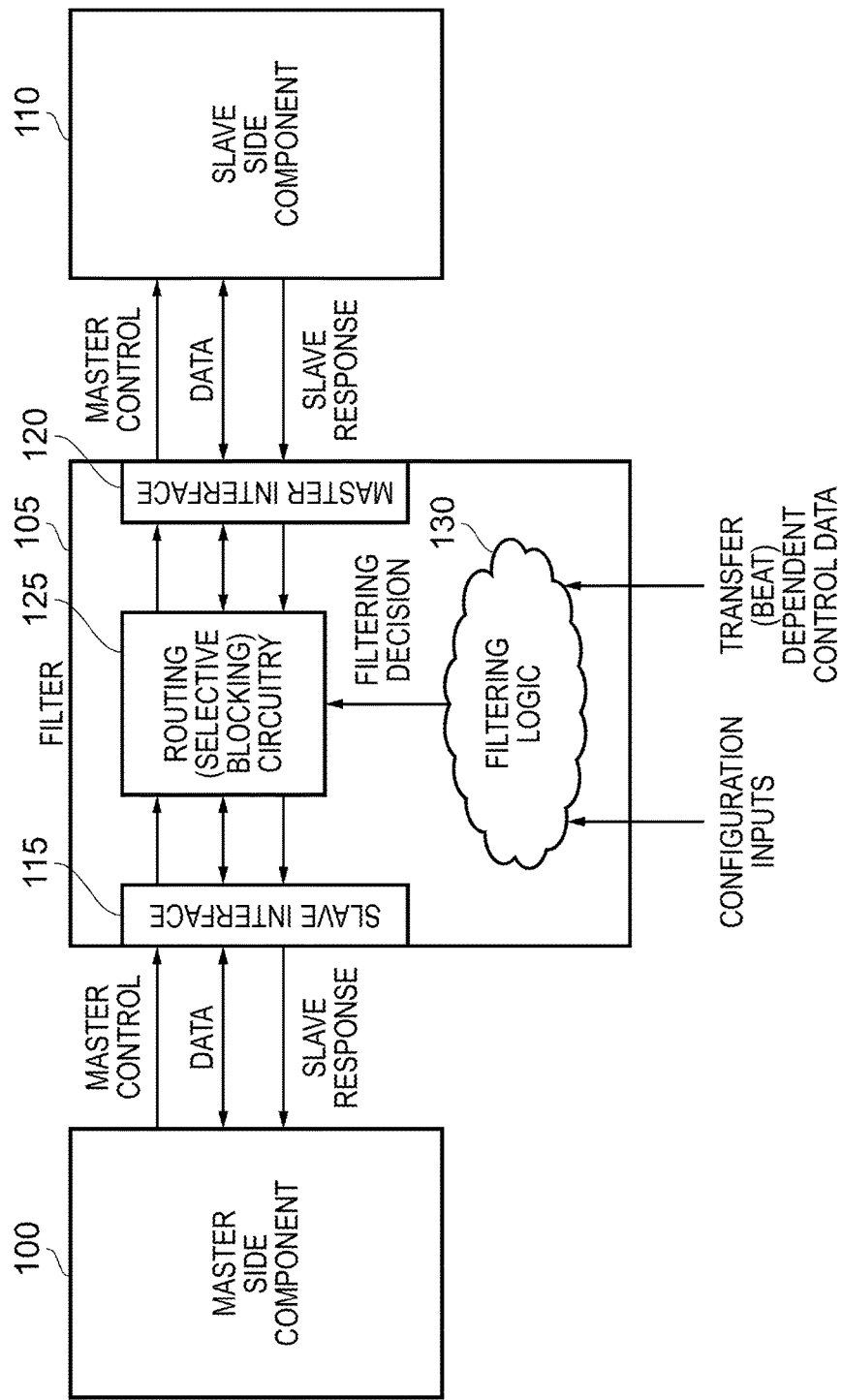
FIG. 2 is a block diagram providing more details of the filtering circuitry in accordance with one embodiment.

FIG. 2 is a block diagram illustrating in more detail components provided within the filter circuits shown in FIG. 1. In particular, a filter circuit 105 is shown located between a master side component 100 and a slave side component 110. Whilst in some instances the master side component 100 may be the master device itself, such as in the example of the filter circuit 62 shown in FIG. 1, in other embodiments the master device may be coupled to the filter 105 via one or more intervening components (and those intervening components may indeed include one or more other filter circuits). For example, considering the filter circuitry 72 of FIG. 1, the master side component 100 may actually be a component within the interconnect 60, such as a latching stage used to handle the onward propagation of transfers from upstream master components.

Similarly, whilst the slave side component 110 may in some instances be the slave device itself, such as in the example of the filter circuitry 72 of FIG. 1, in other embodiments the filter circuitry may be coupled to the slave device via one or more intervening components, such as for example is the case for the filter within the block 74 for transfers destined for the slave device 45, where there is then an intervening further filter circuit 76.

The filter circuitry 105 has a slave interface 115 for coupling to the master side component 100 and a master interface 120 for coupling to the slave side component 110. As mentioned earlier, transactions are performed between a master device and a slave device in order to transfer data between the master device and the slave device in either direction, and each transaction will consist of one or more transfers. A number of signals will be passed through the interconnect circuitry for each transfer. As shown in FIG. 2, the signals can generally be considered to be of three types. In particular, master control signals can be issued from the master side component identifying the nature of the transfer, the address being accessed, etc. Data signals will also be generated, which for a write operation will pass from the master side to the slave side, and for a read operation will pass from the slave side to the master side. In addition, certain slave response signals can be issued from the slave side to the master side, for example to provide information about the status of the transfer (such as whether it has completed successfully), to cause the master device to prolong a transfer when the slave device is still handling a preceding transfer, etc. The exact form of the signals generated will be dependent on the bus protocol adopted within the interconnect circuitry, the bus protocol defining the requirements for the various signals routed through the interconnect circuitry to represent the transfers, and also typically identifying allowed transitions in one or more of those signals. Whilst the techniques described herein may be applied to a variety of different bus protocols, for the purpose of illustration the embodiments will be described with reference to the Advanced High-performance Bus (AHB) protocol specified in the Advanced Microcontroller Bus Architecture (AMBA) developed by ARM Limited, of Cambridge, United Kingdom.

As shown in FIG. 2, the filter circuitry 105 includes routing circuitry 125, which will also be referred to herein as selective blocking circuitry. The routing circuitry is responsible for routing the various signals of each transfer between the slave interface 115 and the master interface 120 in order to enable transfers presented to the slave interface 115 from the master side component 100 to be propagated on to the slave side component 110 from the master interface 120. In addition, filtering logic 130 is provided that receives various input variables, and performs a combinatorial operation using those input variables in order to generate a filtering decision that is then provided as a control signal to the routing circuitry 125. When the filtering decision indicates a block condition, then the routing circuitry 125 is arranged to block one or more of the signals of a transfer from being propagated between the slave interface 115 and the master interface 120. In one embodiment, this involves blocking the one or more of the signals received from the slave interface 115 that are destined for the master interface 120, optionally replacing them with default value signals, and then internally generating suitable signals for routing back to the slave interface 115 for onward propagation to the master side component, which take the place of the signals that would have been generated by the slave side component 110 had the transfer been propagated on to the master interface 120 for provision to the slave side component. As mentioned earlier, in some embodiments not all of the signals received from the slave interface 115 that are destined for the master interface 120 need to be blocked in order to block the transfer, but for ease of illustration it will be assumed for the remainder of the embodiment description that all such signals are blocked.

Figure 3:
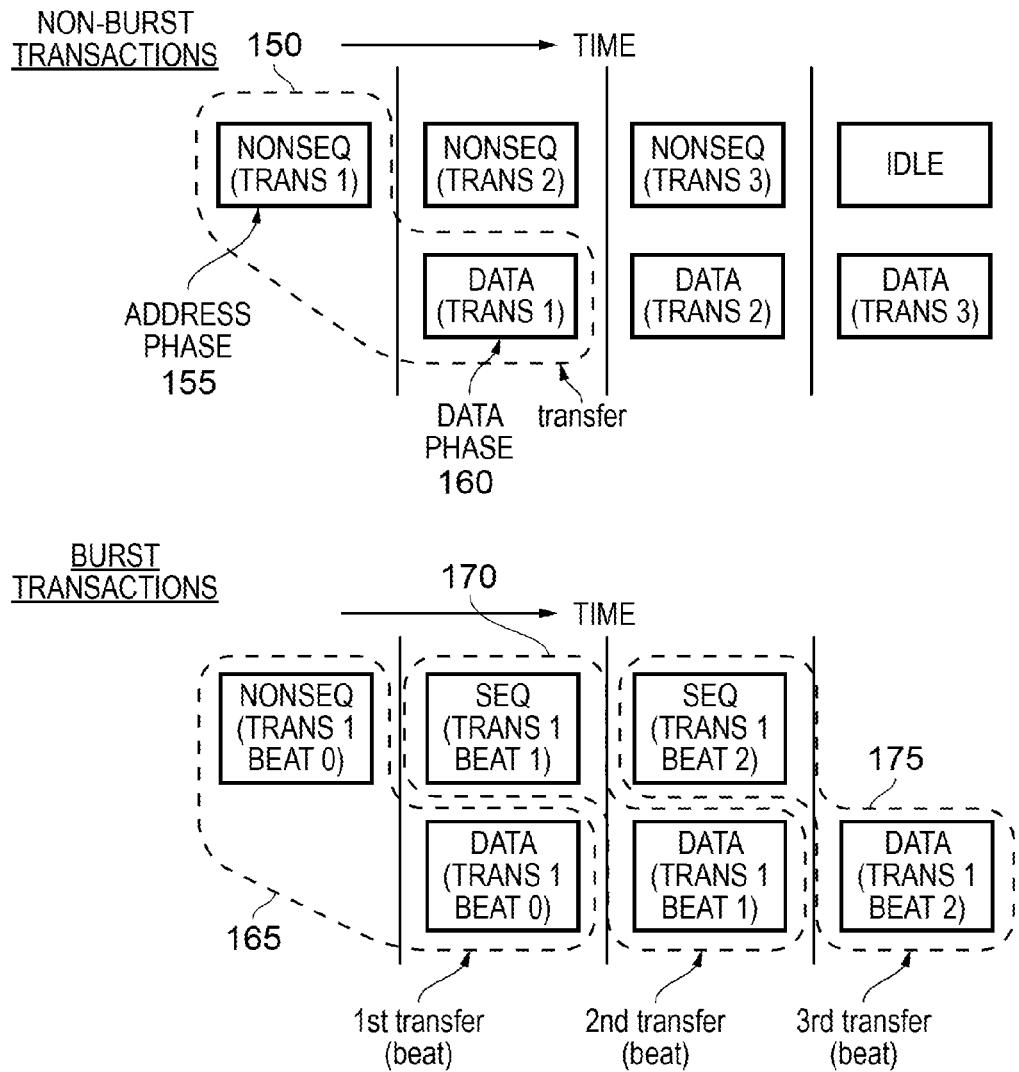
FIG. 3 is a diagram schematically illustrating the form of non-burst transactions and burst transactions to which the filtering techniques of the described embodiments may be applied.

FIG. 3 illustrates two types of transaction that can be processed by the apparatus of the described embodiments. As shown in the upper part of the figure, non-burst transactions can be processed, a non-burst transaction including a single transfer 150. In accordance with the AHB protocol, each such transfer includes an address phase 155 and a subsequent data phase 160. The master control signals shown in FIG. 2 are valid during the address phase, whilst the data and slave response signals are valid during the data phase 160. During the address phase, an address signal is provided identifying the address being accessed. In addition, various other control signals are issued in the address phase, and in the above mentioned AHB protocol one such signal is the "HTRANS" signal which indicates the transfer type of the current transfer. For non-burst transactions, the transfer will be marked as a non-sequential (NONSEQ) transfer as shown for the address phase 155 of the transfer 150 in FIG. 3.

As also shown in FIG. 3, the individual transactions can be handled in a pipelined way, such that whilst the data phase 160 of the transfer 150 is being handled, the address phase of a next transaction can also be in the process of being handled. Hence, considering the filter circuitry 105, it can simultaneously be arranged to be handling the address phase of one transaction and the data phase of a preceding transaction, and separate filtering decisions from the filtering logic may apply to those different transfers.

As also shown in FIG. 3, the apparatus can be used to handle burst transactions, a burst transaction comprising a plurality of transfers, such as the transfers 165, 170, 175 shown in FIG. 3. These individual transfers may also be referred to as "beats" of the burst transaction. A non-burst transaction can hence be viewed as a transaction with a single beat. As shown in the lower half of FIG. 3, the first transfer of a burst transaction also has its HTRANS signal set to NONSEQ to identify that it is a non-sequential transfer, but each of the subsequent transfers has the HTRANS signal set to "SEQ", identifying that they are sequential transfers, i.e. transfers occurring to an adjacent address to the address specified in the preceding transfer. Again, the individual transfers can be pipelined so that the address phase of one transfer is being handled at the same time as the data phase of a preceding transfer within the burst.

In accordance with the AHB protocol, other transfer types that can be specified by the HTRANS signal are the "BUSY" type, enabling a master device to insert an idle cycle in the middle of a burst, and the "IDLE" type which the master can output to identify that it does not want to perform a data transfer at that time.

In accordance with the AHB protocol, the slave devices cannot prevent the master from asserting transfers, but one of the slave response signals provided is an "HREADY" signal that is set by the slave to indicate that a transfer has finished being processed by the slave side component. If instead that ready signal is cleared, this indicates that the slave device is still processing the data transfer of a current transfer, and will cause the master device to extend its assertion of the address phase for a next transfer for one or more further clock cycles until the ready signal is asserted, and hence the slave device is ready to accept that next transfer.

In the described embodiment, the interconnect circuitry operates under the control of a bus clock, referred to as the HCLK signal, which controls the timing of all bus transfers. In one embodiment, all signal timings are related to the rising edge of HCLK. Accordingly, by way of example, both the master side component 100 and the slave side component 110 will sample their signals on the rising edge of the HCLK clock signal, with the filter 105 being formed of combinatorial circuitry located between the master side component and the slave side component. In contrast to the signals sampled on the rising edge of the HCLK clock signal, the various input variables to the filtering logic are not constrained to change their value at a timing governed by the bus clock signal, and indeed their values may change at arbitrary times relative to the HCLK signal. These input variables can be provided from components external to the interconnect, such as from a register bank or from other modules in the system. Given that the filtering logic is predominately arranged as combinatorial circuitry, the filtering decision is updated as soon as any of the inputs to the filtering logic change. This provides a high performance mechanism for generating the filtering decision, that ensures that the operation of the filtering logic does not itself introduce delay into the propagation of transfers through the filter 105. Any delay in the handling of individual transfers within the interconnect circuitry can have an overall impact on the performance of the entire bus system. This is particularly problematic in interconnects that operate in accordance with bus protocols like the AHB protocol, where each transaction must finish before the next one can start, and hence it is important for each individual transaction to be handled as quickly as possible.

However, whilst arranging the filtering logic 130 to perform a combinatorial operation based on the input variables in order to generate the filtering decision ensures that there is not a delay in generating the filtering decision when the input values change, it has been found that the potentially arbitrary changes in the values of the various input variables used by the filtering logic can lead to AHB protocol violations on the output of a filter circuit using such a filtering decision. As will be discussed in more detail herein, the filter circuits of the described embodiments provide additional structures to alleviate such problems. However, firstly, to illustrate the protocol violation problems that can occur when the filtering techniques of the described embodiments are not used, the timing diagrams of FIGS. 4A and 4B will be referred to.

FIG. 4A illustrates two non-sequential transfers 200, 230 separated by an idle transfer 220. The HTRANS input signal represents the HTRANS signal provided by the slave interface 115, and the HTRANS output signal represents the equivalent output from the routing circuitry 125 that is made available to the master interface 120.

As shown in FIG. 2, the filtering logic 130 will receive one or more configuration inputs that define a current configuration, and in addition can optionally receive transfer dependent control data. In the example of FIG. 4A it is assumed that the configuration inputs during the first clock cycle take the form CFG1, and do not cause the filtering logic to generate a block condition, i.e. those configuration inputs allow the routing to occur. Assuming any transfer dependent control data also allows the transfer to take place, then the filtering decision routed to the routing circuitry 125 will allow the HTRANS input to be propagated to the HTRANS output, hence resulting in the non-sequential transfer 200 appearing as the non-sequential transfer 205 presented to the master interface 120. The other master control signals of the address phase (not shown in FIG. 4A) are also propagated. At time T1 210, the HREADY input is set high, indicating that the slave device is ready to receive the transaction, and accordingly the non-sequential transaction 205 is sampled by the slave side component 110 at time T1. At this point, the HREADY input may transition to a clear state, as shown by the transition 215, indicating the slave side component is now busy handling the transfer.

In the next cycle, the master exerts an idle transfer 220. During this clock cycle, it is assumed that the configuration has changed to CFG2, such that the filtering decision output by the filtering logic indicates a block condition. This may cause the routing circuitry to block the transfer provided by the slave interface 115, and replace it with default signals provided to the master interface, in the illustration in FIG. 4A it being assumed that the default signals represent an idle transfer 225. Hence, in this particular instance, the blocking of the transfer 220 has no particular effect, since that transfer was in any case an idle transfer.

In the next clock cycle, the slave interface 115 presents a non-sequential transfer 230. However, at time T3, the HREADY signal is still low, and accordingly that non-sequential transfer cannot be sampled at that point in time, and instead is only sampled at the rising edge T4 245 once the HREADY signal has been set high.

Hence, the address phase of the non-sequential transfer has been extended to two clock cycles, and this can cause a potential protocol violation issue if the inputs to the filtering logic 130 change during that period. In particular, in this example it is assumed that the configuration inputs take the form CFG3 during the first clock cycle and this causes the filtering decision to indicate that the transfer is allowed (it being assumed in this instance that any additional transfer dependent control data also allows the transfer to take place). Accordingly, the non-sequential transfer 230 is presented as the non-sequential transfer 235 to the master interface 120.

However, during the second clock cycle of the extended address phase of the non-sequential transfer, the configuration changes to CFG4, which causes the filtering decision to change to a block condition, hence causing the routing circuitry to replace the non-sequential transfer 230 with an idle transfer 240. Accordingly, it is the idle transfer 240 that is sampled at the rising edge 245.

However, the AHB bus protocol requires that a master device must continue to assert a non-sequential transfer until it is accepted by the slave side component, and accordingly changing from the non-sequential transfer 235 to the idle transfer 240 during the period between the rising edge T2 and the rising edge T4 is not allowed by the AHB protocol and represents a protocol violation.

Hence, it can be seen that this particular form of protocol violation can occur when the input variables change during a lengthened address phase of a transfer.

FIG. 4B illustrates an alternative form of protocol violation that can occur when handling a burst transaction. In particular, the burst transaction includes three transfers 250, 265, 280, the first being a non-sequential transfer and the remaining being sequential transfers. A new burst transaction (or indeed a non-burst transaction) is then indicated by the transfer 295. In this example, it is assumed that the HREADY remains set throughout the period shown, and accordingly each transfer is sampled at the rising clock edges 260, 275, 290, 305. However, again it is assumed that the configuration inputs change during each clock cycle, and accordingly while the non-sequential transfer 250 is allowed to propagate to form the non-sequential transfer 255 presented to the master interface 120, the sequential transfer 265 is replaced by an idle transfer 270 due to the filtering logic generating a filter decision indicating a block condition during that clock cycle. However, during the third cycle the configuration again changes, allowing the sequential transfer 280 to be propagated to the master interface 120 as the sequential transfer 285. However, according to the AHB protocol specification, a sequential transfer cannot follow an idle transfer, and accordingly this represents a protocol violation.

Just for completeness, it should be noted that it is assumed in FIG. 4B that the configuration CFG4 in this instance allows the non-sequential transfer 295 to be propagated. In one embodiment, the configuration inputs are used in combination with transfer dependent control data to make the final filtering decision. The actual form of the input variables will depend on the function being performed by the filtering logic. For example, the filtering logic may be used to provide a security filter to ensure that non-secure master devices do not access memory addresses identified as secure. In this context, the configuration CFG4 could for example identify that the master device requesting the transfer is non-secure. Whether this particular configuration results in a filtering decision that blocks the transfer may then vary dependent on transfer dependent control data, which could for example indicate whether the particular address being accessed by that transfer is a secure address or a non-secure address. Hence, in such embodiments, the configuration input itself is not ultimately determinative of whether the filtering decision allows the transfer to be propagated or causes the transfer to be blocked. However, it will be appreciated that in some embodiments there may not be transfer dependent control data, and the configuration inputs themselves will determine the filtering decision.

Figure 5:
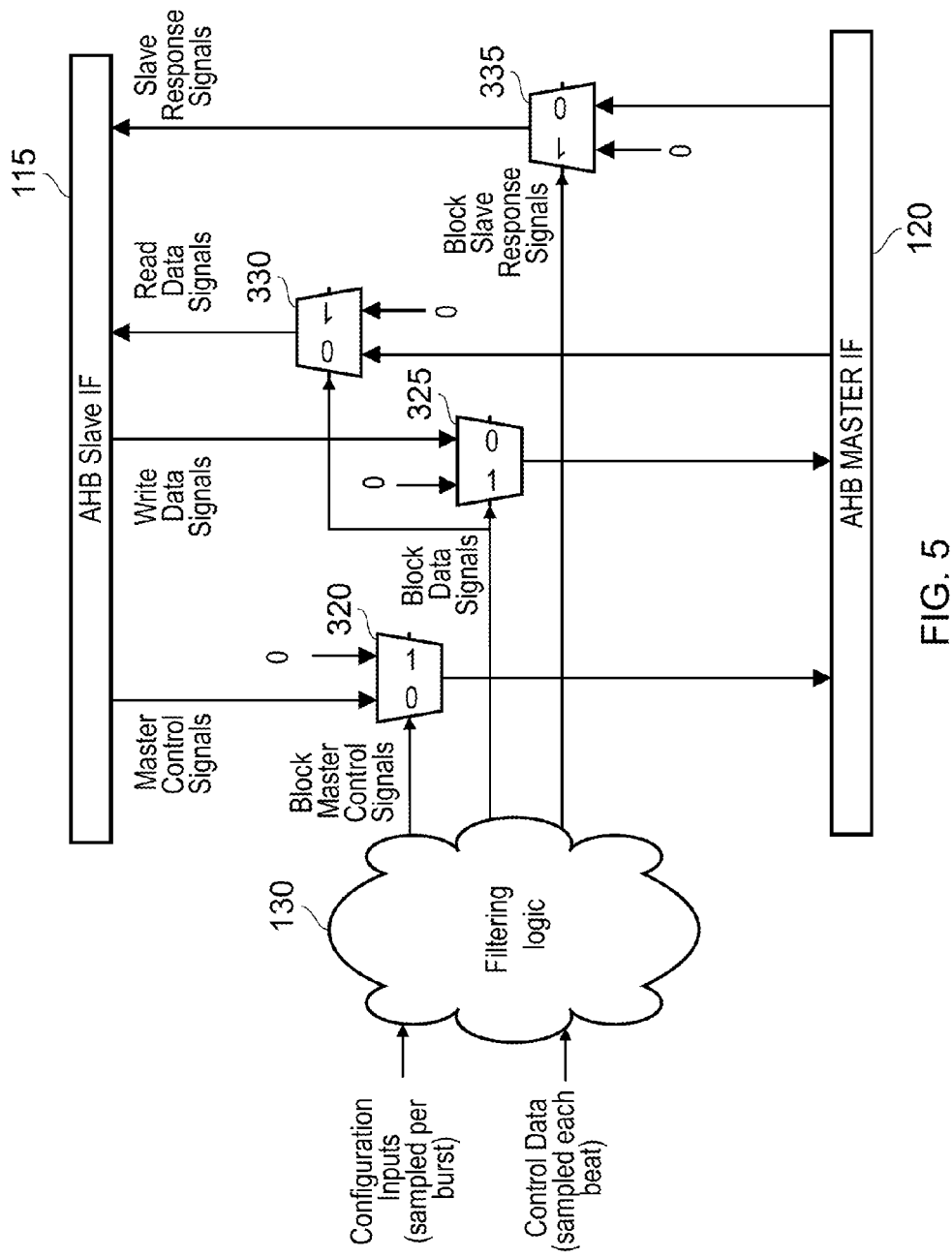
FIG. 5 illustrates in more detail how the filtering decision from the filtering logic can be used to selectively block one or more signals representing individual transfers, in accordance with one embodiment.

FIG. 5 is a diagram illustrating in more detail the routing circuitry that may be provided within the filter circuitry 105 in accordance with one embodiment. As shown, a series of multiplexing elements 320, 325, 330, 335 can be placed in the paths between the AHB slave interface 115 and the AHB master interface 120 allowing the various master control signals, write and read data signals, and slave response signals to either be propagated or blocked. In the event that they are blocked, those signals can be replaced by default values, which for the sake of illustration in this example are shown as logic 0 values.

As will be discussed in more detail with reference to the remaining figures, in order to alleviate the above described protocol violation situations, the operation of the filtering logic is modified so that the control data (i.e. the transfer dependent data) is sampled for each transfer (also referred to herein as each beat) to produce a filtering decision that is then maintained for the entirety of that transfer. The configuration inputs in contrast may be sampled once per burst for a burst transaction, so that whilst the filtering decision generated for each transfer of such a burst transaction can still change dependent on the beat dependent control data, those individual filtering decisions for the beats of the burst transaction will not vary due to any changes in the configuration inputs that occur during the duration of the burst transaction.

As mentioned earlier, the master control signals are transferred during the address phase of a transfer, and hence when the filtering logic does not block the transfer, the master control signals will be routed from the slave interface 115 via the multiplexer 320 to the master interface 120, from where they can then be provided to the slave side component 110. However, if the filtering logic produces a filtering decision indicating a block condition for that transfer, then those master control signals are not propagated, and accordingly there is no address phase to propagate on from the master interface 120 to the slave device. The slave device hence does not process that transfer. However, in one embodiment it is still considered appropriate to provide some form of data phase response for that transfer to the master device through the slave interface 115. The nature of that response can be varied dependent on embodiment, and in particular may vary dependent on the function being performed by the filter. For example, considering the earlier-mentioned security-based filter, in some instances it may be considered not to be appropriate to explicitly flag to the master device that the transfer it has initiated has caused a security problem. In that instance, the slave response signals may be generated internally within the filter and routed back via the multiplexer 335 to the slave interface 115 for onward propagation to the master device, in that instance those response signals effectively providing a fake response. They may for example indicate that the transfer has completed successfully, and if the transfer was a read transfer, some dummy read data may also be output via the multiplexer 330.

However, in other instances it may be determined that it is appropriate to advise the master device that an error has occurred. For example, in a non-security scenario, certain filtering may still be performed based on master identifier values. In particular, each master can be given a different identifier value, and it may be arranged that certain slave devices are inaccessible to certain master devices, or at least certain subsets of the address range within those slave devices are inaccessible to certain master devices. In that instance, the configuration inputs received by the filter logic can identify rules about which address ranges/slave devices are accessible to which masters, and the filtering logic can then generate an appropriate filtering decision to either allow the transfer to be propagated, or to block the transfer, dependent on the master identifier for the master initiating the current transfer and the address that is seeking to be accessed. For example, the configuration input(s) may identify which master devices are allowed to access which slave devices, with the master identifier and address information provided by the master device during the address phase of a transfer being used to identify whether that transfer should be blocked based on that configuration information. In such an example, there may be no beat dependent control data. In the event that the transfer is blocked, it may be considered appropriate to set the slave response signals to identify an error condition, so that the master device is aware that the transfer it has initiated has failed. Again, this error signal can be generated internally within the filter, and returned via the multiplexer 335 to the slave interface 115 for onward propagation to the master side component 100.

Figure 6:
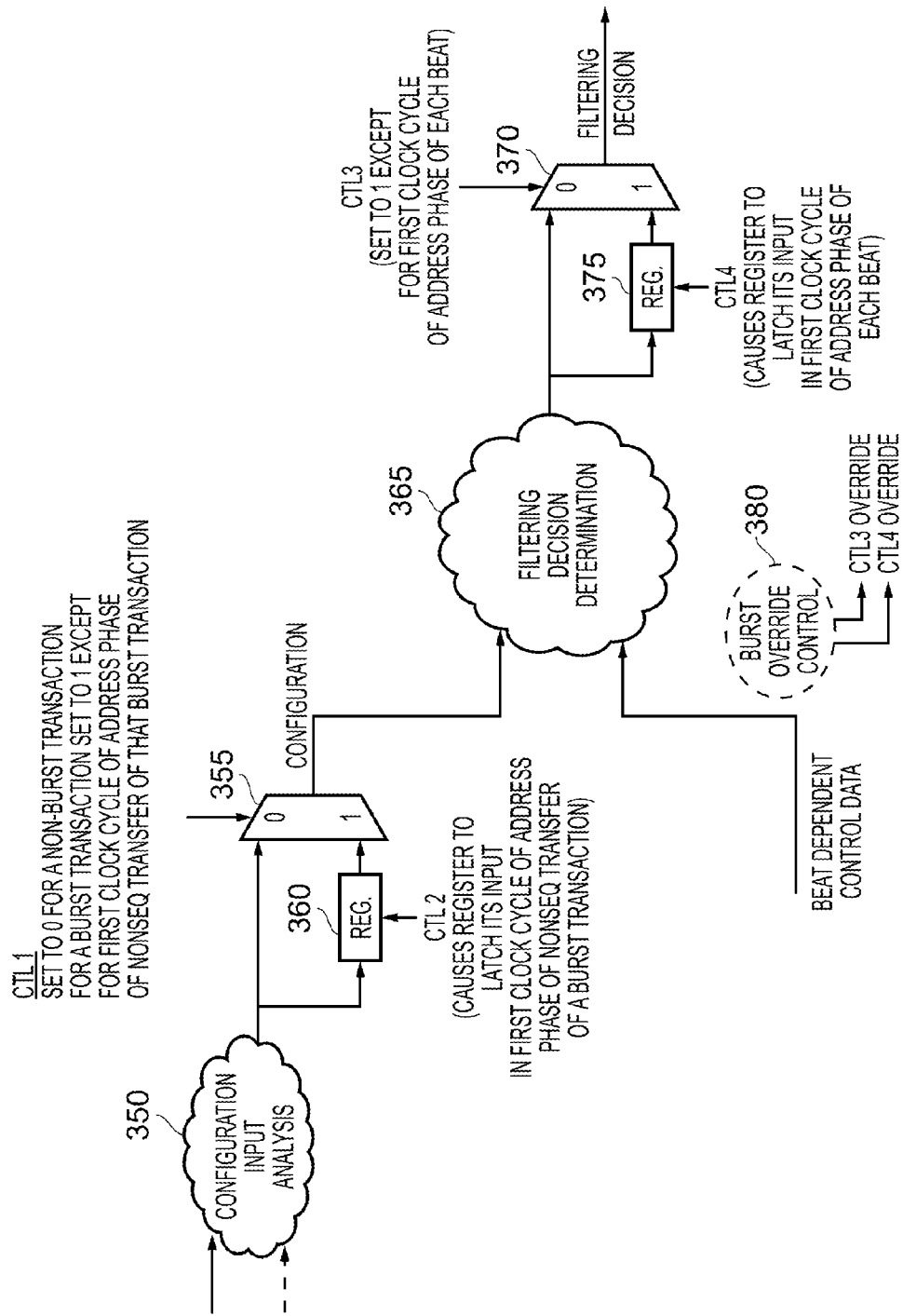
FIG. 6 is a diagram schematically illustrating the operation of the filtering logic of FIG. 5 in accordance with one embodiment.

FIG. 6 is a diagram illustrating in more detail the filtering logic 130 of FIG. 5. Circuitry 350 is provided to perform analysis of the configuration inputs resulting in a configuration being output via the multiplexer 355 for provision to filtering decision determination circuitry 365. In some embodiments, there may be multiple inputs specifying configuration data, which need subjecting to some combinatorial operation within the circuitry 350, whilst in other embodiments only a single item of configuration data may be provided, in which case the circuitry 350 may not be required. As discussed earlier, the configuration can take a variety of forms, but in one embodiment may identify the nature of the master device performing the transaction. For example, in a security-based filter, the configuration may identify whether the master device is a secure device or a non-secure device.

As also shown in FIG. 6, the filtering decision determination logic 365 receives beat dependent control data. This again can take a variety of forms, but purely by way of illustration could for example provide control data that varies dependent on the address being accessed by each individual transfer. Hence, for the above mentioned security-related example, the beat dependent control data may identify whether the address being accessed is a secure address or a non-secure address.

Based on these various inputs, the filtering decision determination circuitry generates a filtering decision which is routed via the multiplexer 370 to the routing circuitry 125.

To address the potential protocol violation that can arise due to address phases of transfers being extended for multiple cycles (whilst waiting for the HREADY signal to be asserted), a storage element 375 is provided to selectively latch a current filtering decision on receipt of a particular control signal. The storage element can take a variety of forms, for example a register, a flip-flop, etc. As shown in FIG. 6, the storage element 375 can be controlled by a control signal that causes it to latch the filtering decision received at its input during the first clock cycle of the address phase of each beat (i.e. each transfer). This is irrespective of whether the transaction is a burst transaction (comprising multiple beats) or a non-burst transaction (comprising a single beat). The multiplexer 370 is then controlled so that it outputs the filtering decision generated by the filtering decision determination circuitry 365 directly during the first clock cycle of the address phase of each beat, but otherwise sets the multiplexer to output as the filtering decision the stored value in the storage element 375. This ensures that the same filtering decision is maintained for the duration of each beat, and accordingly the protocol violation problem illustrated by way of example earlier with reference to FIG. 4A does not arise, since the filtering decision cannot change part way through a transfer, irrespective of any changes in the configuration input values or beat dependent control data.

Considering the configuration inputs, a storage element 360 (which like the storage element 375 can take a variety of forms, for example a register, a flip-flop, etc.) is controlled so as to latch its input during the first clock cycle of the address phase of a NONSEQ transfer of a burst transaction, i.e. during the first clock cycle of the first transfer of a burst transaction.

The multiplexer 355 can then be controlled so that for a burst transaction the configuration data output from the multiplexer 355 is that stored in the storage element 360 other than during the first clock cycle of the address phase of the NONSEQ transfer of that burst transaction. Hence, during the very first clock cycle of the first transfer of a burst transaction the configuration is provided directly by the output of the configuration input analysis circuitry 350, but for all subsequent clock cycles of all subsequent transfers of the burst transaction the configuration data used is that stored in the register 360.

Whilst in one embodiment, the storage element may also be configured to latch the configuration data generated during the first clock cycle of the address phase of a non-burst transaction, this is not required, and in the embodiment shown in FIG. 6 the multiplexer 355 always selects its top input for a non-burst transaction. In particular, a non-burst transaction will only contain a single transfer, and the elements 370, 375 will ensure that the same filtering decision is maintained for that transfer. Accordingly, there is no requirement to store the configuration data for a non-burst transaction within the storage element 360.

By maintaining the same configuration data for the entirety of a burst transaction, through use of the storage element 360, this ensures that no changes in the filtering decisions used for the separate beats of the burst transaction arise due to arbitrary changes in the configuration inputs. In particular, once the configuration has been determined during the very first clock cycle of the first transfer of the burst, that same configuration is maintained for the duration of the burst. This reduces the likelihood of the occurrence of the protocol violation discussed earlier with reference to FIG. 4B.

However, it is still necessary to allow the filter to make separate filtering decisions for each beat of a burst transaction. For example, considering the earlier mentioned security-based filtering example, it may be that a non-secure device issues a burst transaction to access a sequence of memory addresses, where the memory addresses begin in non-secure address space, but due to the length of the burst transaction some later transfers actually seek to access secure address space. Those later transfers still need to be blocked. It will be appreciated that the circuitry of FIG. 6 allows such operation, since a filtering decision is still made for each beat of the burst transaction.

As will be discussed in more detail with reference to FIG. 7, to remove any remaining chance of the type of protocol violation shown in FIG. 4B, burst override control circuitry 380 can be provided that, in certain situations, can override the control signals used for the multiplexer 370 and the storage element 375 to ensure that once one beat of a burst transaction has been blocked, all remaining beats are also blocked. Accordingly, there will never be an idle to sequential transition in the HTRANS signal.

Figure 7:
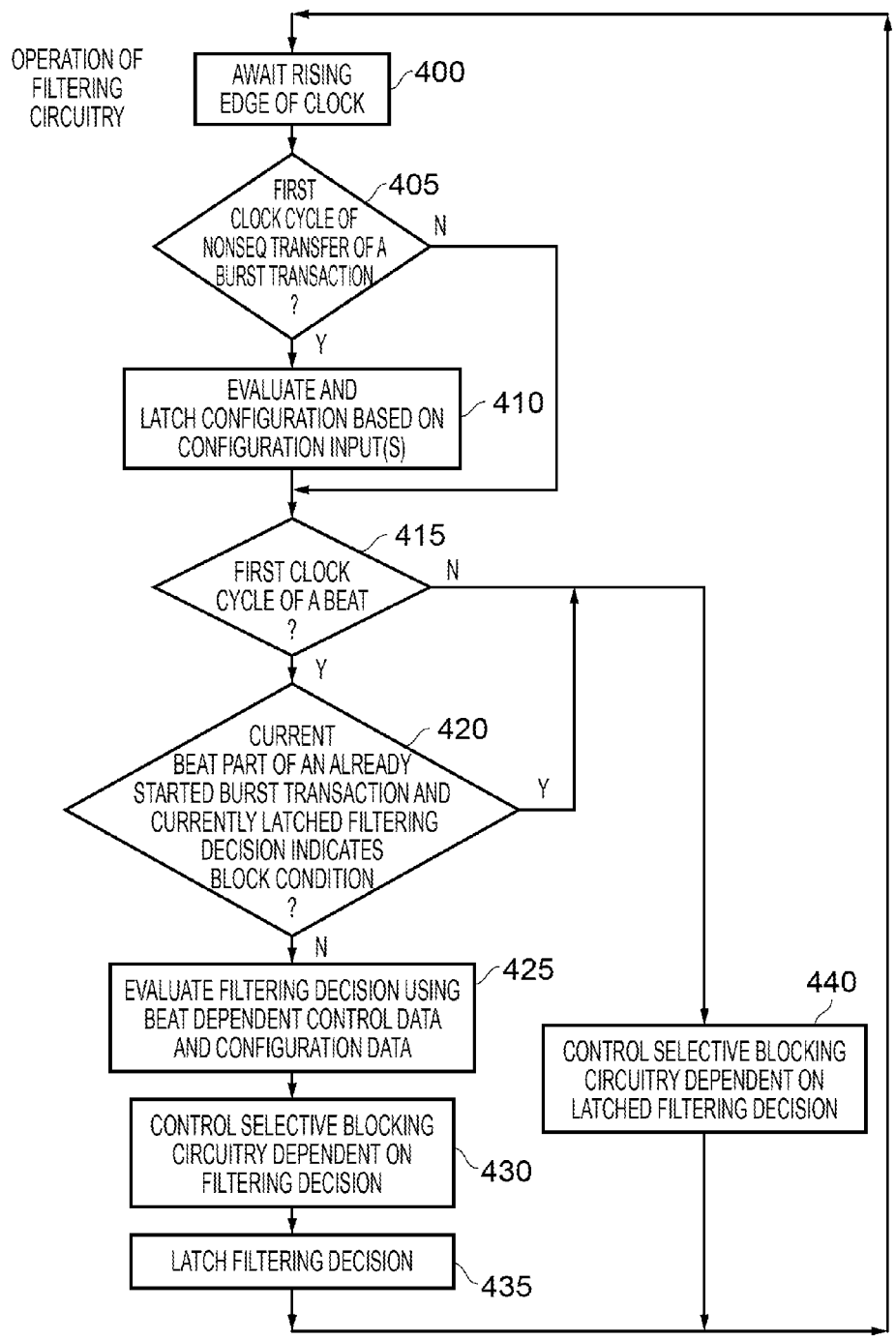
FIG. 7 is a flow diagram illustrating the operation of the filter circuitry of FIG. 5 in accordance with one embodiment.

FIG. 7 is a flow diagram illustrating the operation of the filtering circuitry in accordance with one embodiment. At step 400, the rising edge of the clock is awaited, whereafter it is determined at step 405 whether the filter circuitry is currently operating in the first clock cycle of a non-sequential transfer of a burst transaction. If it is, then the configuration inputs are evaluated to produce a configuration which is latched within the storage element 360. The process then proceeds to step 415, or proceeds directly to step 415 from step 405 if the filter circuitry is not operating in the first clock cycle of a non-sequential transfer of a burst transaction. At step 415, it is determined whether the filter circuitry is operating in the first clock cycle of a beat (as mentioned earlier a burst transaction will have multiple beats (i.e. multiple transfers), whilst a non-burst transaction will have a single beat (i.e. a single transfer)). From the earlier description of FIG. 6, it will be appreciated that if the filtering circuitry is not operating in the first clock cycle of a beat, then there will already be a latched filtering decision in the storage element 375, and accordingly the process proceeds to step 440 where the selective blocking circuitry (i.e. the routing circuitry 125) is controlled dependent on the latched filtering decision. The process then returns to step 400.

However, if the filtering circuitry is operating in the first clock cycle of a beat, then it is determined at step 420 whether the current beat is part of an already started burst transaction and the currently latched filtering decision indicates a block condition. In particular, if the current beat is not the first beat of the burst transaction there will be a currently latched filtering decision for a preceding beat of the transaction, and if that currently latched filtering decision indicates a block condition, then as discussed earlier, in one embodiment all subsequent beats of the burst transaction are also blocked. Accordingly, at this point, the process proceeds from step 420 to step 440, to cause the currently considered beat to be blocked.

If it is determined at step 420 that the current beat is not a beat of a burst transaction, or is part of a burst transaction but the currently latched filtering decision is not indicating a block condition, then the process proceeds to step 425 where the filtering decision is evaluated using the beat dependent control data, and the configuration data output from the multiplexer 355. The selective blocking circuitry is then controlled at step 430 dependent on that filtering decision, and in addition the filtering decision is latched within the storage element 375 at step 435. The process then returns to step 400.

Figure 8A:
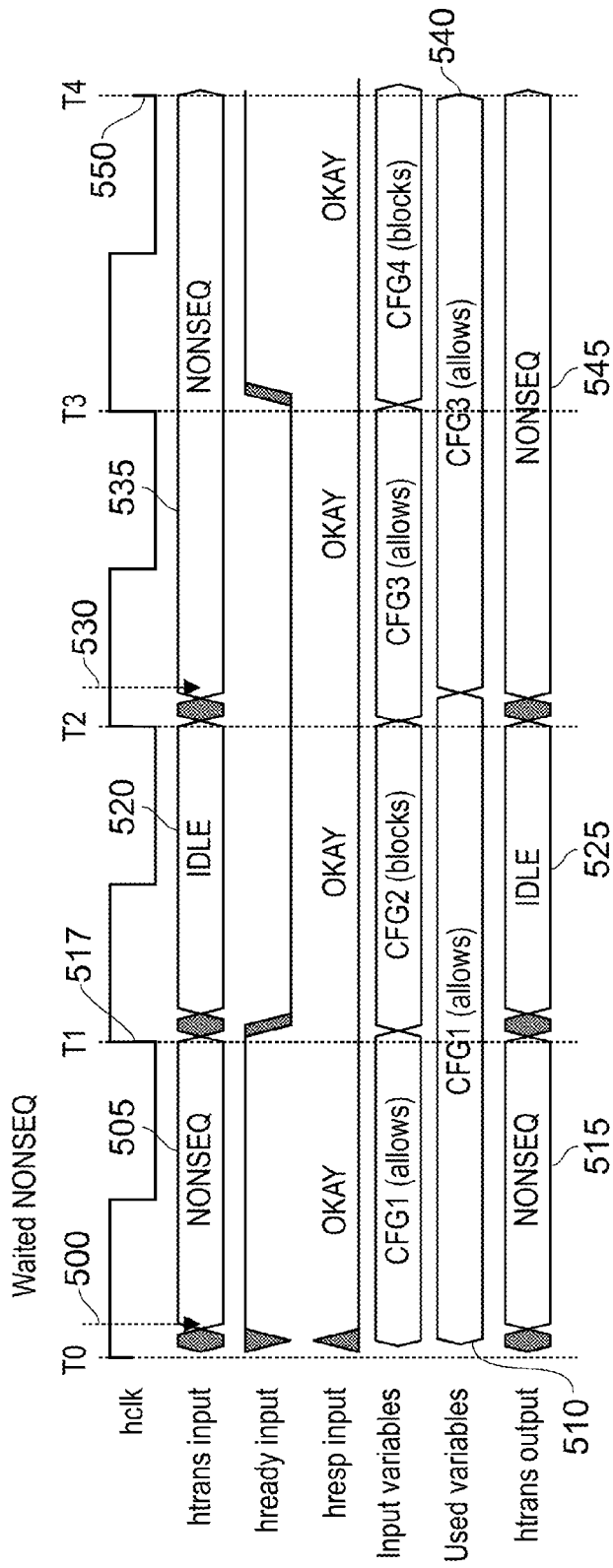
FIGS. 8A to 8C are timing diagrams illustrating the handling of three example transfer sequences when using the filtering circuitry of the described embodiments.
Figure 8B:
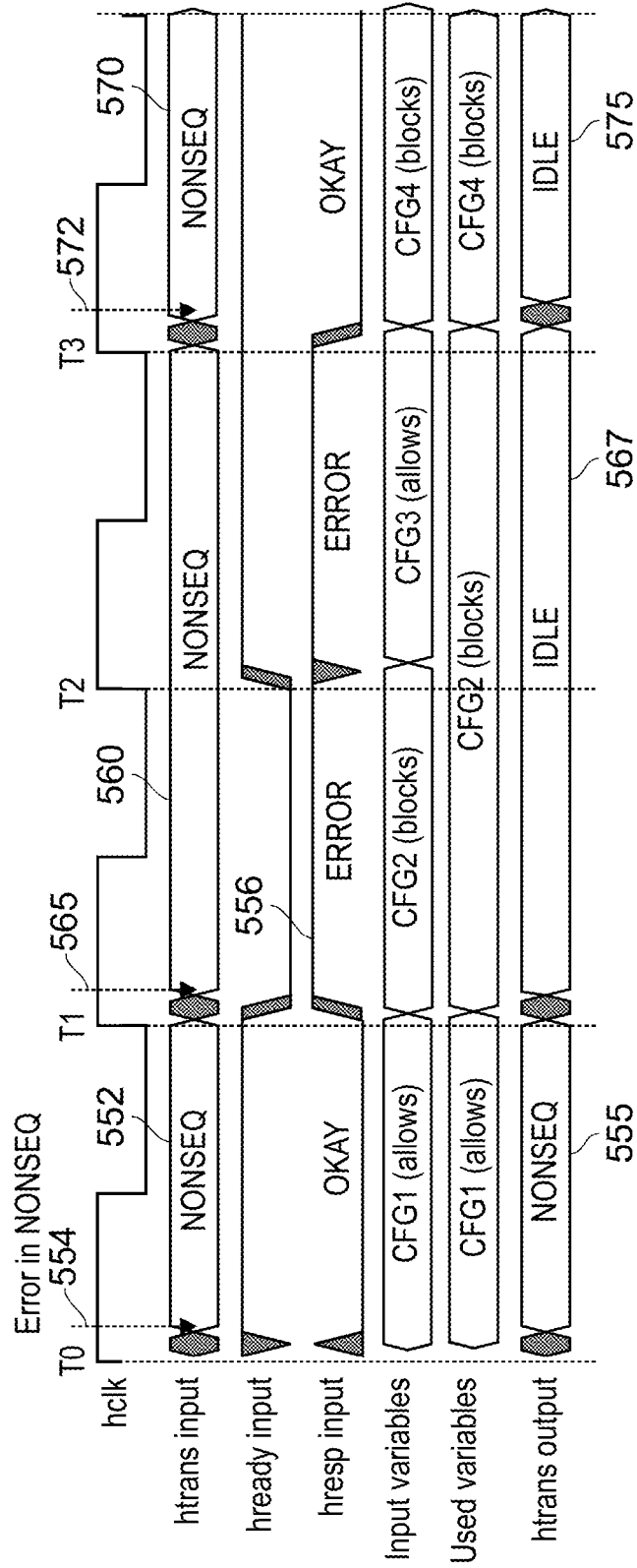
Figure 8C:
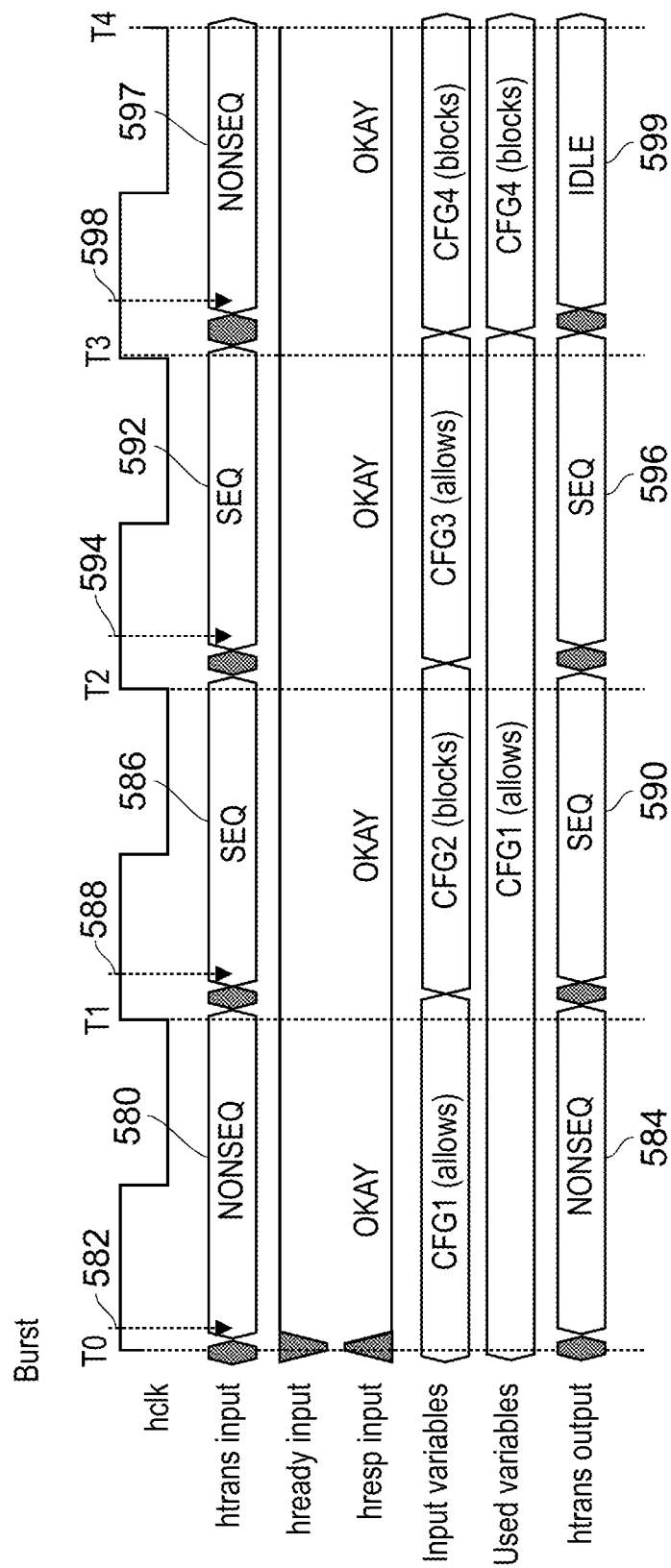

FIGS. 8A to 8C are timing diagrams for three example sequences of transfers, illustrating how the above described operation of the filtering circuitry avoids certain protocol violation scenarios arising. As shown in FIG. 8A, a non-sequential transfer 505 occurs during a first clock cycle, and a filtering decision is made at point 500 based on the configuration values CFG1, and any beat dependent control data. In this instance it is assumed that this causes a filtering decision to be made that allows the transfer to be passed, and accordingly the non-sequential transfer appears on the HTRANS output path as shown by the NONSEQ transfer 515, and is sampled on the rising edge 517 of the clock due to the set HREADY signal.

In the next cycle, the master device issues an idle transfer 520. As mentioned earlier, this effectively means that the master is not making an active transfer during this cycle, and accordingly no filtering decision is required. Thus, the used variables, and hence the latched filtering decision in the storage element 375, is not changed, even though the configuration has changed to the configuration CFG2.

In the third clock cycle, the master asserts the non-sequential transfer 535, and a filtering decision is taken at point 530, on the basis of the configuration CFG3 and any associated beat dependent control data. It is assumed that this results in a filtering decision that allows the transfer, this filtering decision being latched in the storage element 375. Since the transfer is allowed to be propagated, this results in the output of the NONSEQ transfer 545 on the HTRANS output path.

Due to the HREADY signal still being de-asserted at the rising edge T3, the address phase of the non-sequential transfer is extended for a second clock cycle, and only sampled at time T4 550. However, even though the configuration has changed in this next clock cycle to a configuration CFG4 that would cause a blocking condition to be raised by the filtering decision, the latched filtering decision within the register 375 continues to be used (that was based on the configuration CFG3), and accordingly the non-sequential transfer 545 continues to be asserted for this second clock cycle on the HTRANS output path. Accordingly, no NONSEQ to IDLE transition occurs, and accordingly no protocol violation arises.

FIG. 8A also indicates for illustration the HRESP signal which provides the master with additional information on the status of the transfer. This signal is issued during the data phase, and accordingly by way of example the HRESP signal in the second clock cycle relates to the transfer associated with the address phase shown in the first clock cycle. In the example of FIG. 8A, it is assumed that all transfers have proceeded successfully.

FIG. 8B illustrates an alternative example where an error occurs when handling the non-sequential transfer 552. For that non-sequential transfer 552, the filtering decision is taken at point 554 based on the configuration CFG1, which allows the transfer to be propagated as the non-sequential transfer 555, which is then sampled at time T1 due to the set state of the HREADY signal at that time. However, during a subsequent data phase of that transfer, an error occurs within the slave device when processing the transfer, which is indicated by an asserted HRESP signal 556. The filter circuitry propagates this error response from the slave. In accordance with the AHB protocol, the error signal is asserted for two cycles, with the HREADY being low in the first cycle and then high in the second cycle. This gives the master device time to decide what action it wishes to take in response to the error. For example, it may decide to insert an IDLE transfer, or instead continue with its originally planned next transfer. In this example it is assumed that it continues with its originally planned next non-sequential transfer 560, for which a filtering decision is taken at point 565 based on the configuration CFG2, which causes that transfer to be blocked, and hence an IDLE transfer 567 to be presented on the HTRANS output. This non-sequential transfer 560 needs to be extended for two cycles, due to HREADY being de-asserted at time T2. In the second of those cycles, even though the configuration changes to CFG3, which in combination with any transfer dependent control data would have allowed the transfer to proceed, the previously made filtering decision based on the configuration CFG2 continues to be used, and accordingly the transfer continues to be blocked and hence the IDLE transfer 567 continues to be asserted.

When that IDLE transfer 567 is sampled at time T3, the master then issues a further non-sequential transfer 570, for which a filtering decision is taken at point 572 based on the configuration CFG4. It is assumed in this instance that this causes the transfer to be blocked, resulting in the IDLE transfer 575.

FIG. 8C illustrates processing of a burst transaction. This starts with the non-sequential transfer 580, for which a filter decision is taken at point 582 based on the configuration CFG1. It is assumed that this configuration, in combination with the beat dependent control data, allows the transfer to proceed, and accordingly the non-sequential transfer appears as the NONSEQ transfer 584 on the HTRANS output. It is assumed in this example that the HREADY signal remains asserted through the period shown, and all of the HRESP signals indicate that the transfers are handled correctly. Accordingly, in the next cycle, a sequential transfer 586 is issued, and a filtering decision is taken at point 588. Whilst the transfer dependent control data may change, the configuration CFG1 is still used during this time. Again, it is assumed that the transfer is allowed, and accordingly the sequential transfer 590 appears on the HTRANS output. Similarly, the next sequential transfer 592 has a filtering decision taken at point 594, which again allows the transfer to proceed (again on the basis of the configuration CFG1 and any transfer dependent control data), resulting in the sequential transfer 596 appearing on the HTRANS output.

The burst transaction then ends and a new transaction starts with the non-sequential transfer 597 for which a filtering decision is taken at point 598. At this point, the new configuration information can be used, and in this instance that configuration is CFG4, which in combination with any transfer dependent control data causes the transfer to be blocked, and accordingly an IDLE transfer 599 appears on the HTRANS output.

As mentioned earlier, during a burst transaction, if a master is not ready to start the next beat of the burst, it can insert a busy transfer to delay that next active beat. Slave devices are required to respond to a busy transfer with an OK HRESP signal. Whilst the HTRANS signal is set to busy, in accordance with the AHB specification all of the other master control information (address, burst type, etc.) reflect the proper values for the next beat, so when the master is ready for that beat to be performed, only the HTRANS signal needs to be changed from BUSY to SEQ, and no other control information is allowed to change at that time. Accordingly, this essentially means that a beat of a burst transaction can be one of the following three options:
  a non-sequential beat (i.e. the first beat);
  a sequential beat (a successive beat instantly after the previous one); or
  one or more busy transfers and then a sequential transfer (i.e. a delayed successive beat).

With regards to the final option, since the BUSY signal and the SEQ signal following it have all the same control information, then in one embodiment the BUSY transfer is treated as the beginning of the beat, and the decision made during the first clock cycle of that BUSY transfer is then maintained during the subsequent SEQ transfer.

Figure 9A:
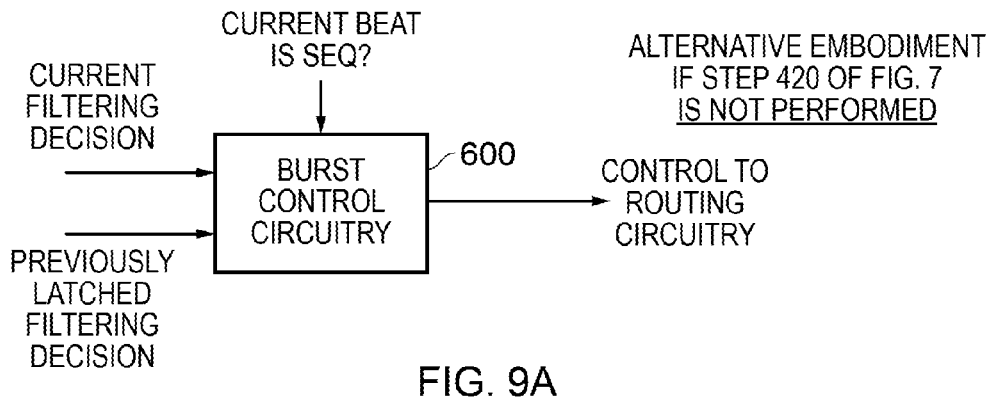
FIG. 9A illustrates some additional circuitry that may be provided within the filter circuitry in an alternative embodiment where the filter circuitry does not perform step 420 of FIG. 7.

FIG. 9A illustrates some additional circuitry that may be provided within the filter circuitry 105 in situations where the filter circuitry does not perform the step 420 of FIG. 7. If the step 420 is not performed, then it will be apparent that when handling a burst transaction it is possible for a blocked transfer to be followed by a transfer that is not blocked (due to the beat dependent filtering decisions made). When using the approach of step 420 of FIG. 7, this allows a lower area and complexity in the construction of the filter, since all subsequent beats of a transaction following a blocked beat are in any event blocked. However, if it is desired not to constrain the operation in that way, then additional circuitry can be added such as the circuitry 600 to perform special case handling in such situations. In particular, the burst control circuitry 600 receives the current filtering decision for the currently considered beat, along with an indication as to whether that current beat is a sequential transfer. It also additionally receives the previously latched filtering decision for the preceding beat in the burst, and based on this information performs the process shown in FIG. 9B in order to selectively generate additional control information for the routing circuitry.

Figure 9B:
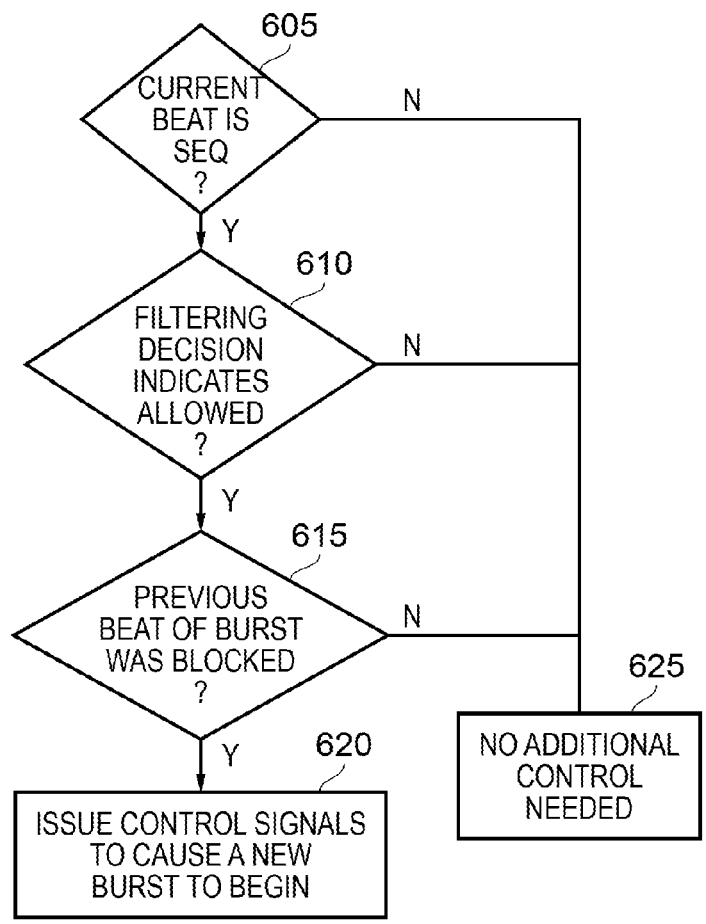
FIG. 9B is a flow diagram illustrating the steps performed by the burst control circuitry of FIG. 9A in accordance with one embodiment.

In particular, as shown in FIG. 9B, at step 605, it is determined whether the current beat is a sequential transfer, and if not the process proceeds to step 625 where no additional control is needed. However, if the current beat is a sequential transfer, it is determined at step 610 whether the filtering decision for this current beat indicates that the transfer is allowed. If not, no additional control is needed, as indicated by step 625.

However, if the current filtering decision indicates that the current beat is allowed, it is then determined at step 615 whether the previous beat of the burst was blocked. If not, no additional control is needed. However, otherwise, control signals need to be issued by the burst control circuitry 600 in order to avoid the protocol violation illustrated with reference to FIG. 4B earlier. In particular, the preceding transfer will have been output as an IDLE transfer due to it being blocked, and it is not allowed to issue a sequential transfer immediately following an IDLE transfer. In one embodiment, at step 620 the burst control circuitry 600 issues control signals to cause a new burst to begin. This will involve converting the SEQ transfer into a NONSEQ transfer indicating the start of a new burst, and potentially updating other control signals such as the burst type signal, burst length, etc.

From the above described embodiments, it will be seen that such embodiments provide a high performance solution for making filtering decisions based on combinatorial operations, so that the generation of the filtering decisions does not contribute to any delay in the propagation of transfers through the interconnect circuitry. However, in addition, it allows for careful control of the filtering decisions so as to avoid certain potential protocol violation scenarios that can arise when using filtering decisions generated using combinatorial logic based on input variables that can change at arbitrary times relative to the timing of the operation of the interconnect circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus, comprising:
a first interface to couple to a master device;
a second interface to couple to a slave device, transactions being performed between the master device and the slave device, where each transaction comprises one or more transfers;
routing circuitry to route between the first interface and the second interface signals representing the one or more transfers; and
filtering decision generation circuitry to perform a combinatorial operation to generate a filtering decision dependent on current values of one or more received input variables;
the routing circuitry being responsive to the filtering decision indicating a block condition for a current transfer, to block the current transfer by preventing one or more of the signals representing that current transfer from being passed between the first interface and the second interface;
the filtering decision generation circuitry being responsive to assertion of the current transfer within the apparatus to generate the filtering decision and to maintain that filtering decision for a duration of time said current transfer is asserted, irrespective of a change in the values of said input variables; wherein:

at least one transaction is a burst transaction comprising multiple transfers;
the filtering decision generation circuitry is responsive to assertion within the apparatus of a first transfer of the burst transaction to determine, from at least one of the input variables, a configuration value for use when performing the combinatorial operation to generate the filtering decision; and
the filtering decision generation circuitry comprising a configuration storage element to store the configuration value, and the stored configuration value being used by the filtering decision generation circuitry when generating filtering decisions for each remaining transfer of the burst transaction.

2. An apparatus as claimed in claim 1, wherein the filtering decision generation circuitry comprises a filtering decision storage element to store the filtering decision generated in response to assertion of the current transfer, the stored filtering decision then being used for the remaining duration of time that said current transfer is asserted.

3. An apparatus as claimed in claim 1, wherein the filtering decision generation circuitry is arranged, when the filtering decision indicates a block condition for one transfer of the burst transaction, to maintain the filtering decision to indicate the block condition for any remaining transfers of the burst transaction.

4. An apparatus as claimed in claim 1, wherein the filtering decision generation circuitry is arranged, when the filtering decision indicates a block condition for one or more transfers of the burst transaction, to cause the routing circuitry to output one or more control signals in association with a first subsequent transfer that is not blocked to identify that first subsequent transfer as being a first transfer of a new burst transaction.

5. An apparatus as claimed in claim 1, wherein each transfer comprises an address phase and a data phase, and the filtering decision generation circuitry is arranged to generate the filtering decision on assertion of the address phase.

6. An apparatus as claimed in claim 5, wherein under a predetermined condition the address phase remains asserted for multiple clock cycles, and the filtering decision generation circuitry is arranged to generate the filtering decision in a first clock cycle that the address phase is asserted and to maintain the filtering decision for at least the multiple clock cycles that the address phase remains asserted.

7. An apparatus as claimed in claim 6, wherein said predetermined condition is a wait condition indicating that handling of a data phase of a preceding transfer is still in progress.

8. An apparatus as claimed in claim 5, wherein when the filtering decision indicates the block condition, the routing circuitry is arranged to internally generate one or more signals to be issued from the first interface for the data phase.

9. An apparatus as claimed in claim 1, wherein the first interface is coupled to the master device via one or more intervening components.

10. An apparatus as claimed in claim 1, wherein the second interface is coupled to the slave device via one or more intervening components.

11. Interconnect circuitry comprising:
a network of connection paths for interconnecting a plurality of master devices and a plurality of slave devices to enable transactions to be performed between the master devices and the slave devices;

one or more filtering circuits located in selected connection paths of the network, each filtering circuit comprising an apparatus as claimed in claim 1.

12. A method of operating a filtering apparatus to filter transactions performed between a master device and a slave device, each transaction comprising one or more transfers, the filtering apparatus having a first interface for coupling to the master device, a second interface for coupling to the slave device, and routing circuitry to route between the first interface and the second interface signals representing the one or more transfers, the method comprising:

performing a combinatorial operation to generate a filtering decision dependent on current values of one or more received input variables;

responsive to the filtering decision indicating a block condition for a current transfer, causing the routing circuitry to block the current transfer by preventing one or more of the signals representing that current transfer from being passed between the first interface and the second interface; and responsive to assertion of the current transfer within the filtering apparatus, generating the filtering decision and maintaining that filtering decision for a duration of time said current transfer is asserted, irrespective of a change in the values of said input variables; wherein:

at least one transaction is a burst transaction comprising multiple transfers;

the step of performing comprises determining, from at least one of the input variables, a configuration value for use when performing the combinatorial operation to generate the filtering decision, responsive to assertion of a first transfer of the burst transaction to determine; and the step of performing comprises storing the configuration value, and the stored configuration value being used when generating filtering decisions for each remaining transfer of the burst transaction.

13. An apparatus, comprising:

means for coupling to a master device;

means for coupling to a slave device, transactions being performed between the master device and the slave device, where each transaction comprises one or more transfers;

means for routing between the means for coupling to a master device and the means for coupling to a slave device signals representing the one or more transfers; and means for performing a combinatorial operation to generate a filtering decision dependent on current values of one or more received input variables;

means for routing being configured to blocking a current transfer, responsive to the filtering decision indicating a block condition for the current transfer, by preventing one or more of the signals representing that current transfer from being passed between the means for coupling to a master device and the means for coupling to a slave device;

the means for performing being configured to generate, responsive to assertion of the current transfer within the apparatus, the filtering decision and for maintaining that filtering decision for a duration of time said current transfer is asserted, irrespective of a change in the values of said input variables;

wherein: at least one transaction is a burst transaction comprising multiple transfers;

the means for performing is responsive to assertion within the apparatus of a first transfer of the burst transaction to determine, from at least one of the input variables, a configuration value for use when performing the combinatorial operation to generate the filtering decision; and the means for performing comprising a configuration storage element to store the configuration value, and the stored configuration value being used by the means for performing when generating filtering decisions for each remaining transfer of the burst transaction.

* * * * *